(12) United States Patent
Chao Lee (10) Patent No.: US 10,657,159 B2
(45) Date of Patent: May 19, 2020

(54) METHOD FOR GENERATING A CATEGORY CLUSTERING DATA USING A DATA TRANSMISSION STRUCTURE

(71) Applicant: Ying-Jih Chao Lee, Taipei (TW)

(72) Inventor: Ying-Jih Chao Lee, Taipei (TW)

( * ) Notice: Subject to any disclaimer, the term of this patent is extended or adjusted under 35 U.S.C. 154(b) by 307 days.

(21) Appl. No.: 15/871,192

(22) Filed: Jan. 15, 2018

(65) Prior Publication Data

US 2018/0210947 A1 Jul. 26, 2018

(30) Foreign Application Priority Data

Jan. 20, 2017 (TW) .............................. 106102058 A (51) Int. Cl.
*G06F 17/30* (2006.01)
*G06F 16/28* (2019.01)
*G06N 7/02* (2006.01)
*G06K 9/62* (2006.01)
*H04L 1/00* (2006.01)
*H04B 1/707* (2011.01)
*G06Q 10/10* (2012.01)
*G06Q 40/06* (2012.01)
*G06N 7/06* (2006.01)
*G06K 9/00* (2006.01)
*H04J 13/00* (2011.01)

(52) U.S. Cl.
CPC ....... *G06F 16/285* (2019.01); *G06K 9/00536* (2013.01); *G06K 9/6218* (2013.01); *G06N 7/02* (2013.01); *G06N 7/06* (2013.01); *G06Q 10/10* (2013.01); *G06Q 40/06* (2013.01); *H04B 1/707* (2013.01); *H04J 13/00* (2013.01); *H04L 1/0047* (2013.01)

(58) Field of Classification Search
CPC .............. G06F 16/285; G06K 9/00536; G06K 9/6218; G06N 7/02
USPC ................................................. 707/600–899
See application file for complete search history.

(56) References Cited

U.S. PATENT DOCUMENTS

2014/0114796 A1  4/2014 Huang et al.
2016/0110812 A1* 4/2016 Mun ...................... G06Q 40/06
                                                       705/36 R

FOREIGN PATENT DOCUMENTS

CN   102255769 A   11/2011
CN   103455534 A   12/2013
CN   103473360 A   12/2013
(Continued)

*Primary Examiner* — Isaac M Woo
(74) *Attorney, Agent, or Firm* — Li & Cai Intellectual Property (USA) Office (57) ABSTRACT

A method for generating a category clustering data via a code division multiple access (CDMA) structure comprises the steps of: dividing a dataset to generate dataset categories; and generating the category clustering data via the CDMA structure processing the dataset categories according to the dataset categories; wherein the dataset includes a plurality of variable sequences; wherein dividing the dataset includes the step of: using a variable slope of each of the variable sequences to perform a segment division on a corresponding variable sequence to generate a plurality of segments; and using a distance, an angle and a slope to perform an affinity group on the variable sequences to generate a plurality of groups. The method for generating the category clustering data via the CDMA structure can make the category clustering data to have a very high similarity.

9 Claims, 11 Drawing Sheets

(56) References Cited

FOREIGN PATENT DOCUMENTS

| CN | 103714238 A | 4/2014 |
|----|-------------|--------|
| CN | 105550715 A | 5/2016 |

* cited by examiner

FIG. 2c
A figure of generating a sine wave

METHOD FOR GENERATING A CATEGORY CLUSTERING DATA USING A DATA TRANSMISSION STRUCTURE

FIELD OF THE INVENTION

The present invention relates to a method for generating a category clustering data; in particular, to a data transmission structure based method for generating a category clustering data

BACKGROUND OF THE INVENTION

Time length is not applicable as a distance in traditional fuzzy C-means (FCM) algorithms, and information of a distance change in a distance axis can only be known, a lack of smoothness of a shape change cannot be solved because the distance lacks information of time, and a good correct rate of category clustering cannot be provided because a shape variation is decided by a slope. Traditional fuzzy slope time series (FSTS) algorithms are not adaptable for unstable wave motions and instant change in angle, information of a relative change of a similar shape trend in a time axis can only be known, rapid fluctuations in a long time sequence of an economic time or a cycle swing of a trend curve cannot be solved because of an insufficient information of the trend curve, and correct rate of category clustering cannot be provided because a wave motion variation is decided by an angle. Traditional fuzzy spectral angle matching (F SAM) algorithms are not adaptable for length change of the distance, a relative polarity of three axis between variables and an origin, and a change in a relationship between a stability and a wave motion angle can only be known, a distance variation of fast moving, long distance, short distance in distance cannot be provided because of an insufficient information of the distance caused by drastic changes of the trend curve, and correct rate of category clustering cannot be provided because variation of the distance is decided by the distance.

Traditional data transmitting and receiving are carried out directly by transmission lines, rarely by channel modules. Even if the channel modules are used, only hardware structure processing is involved. They have nothing to do with analyzing category clustering data, and a processing method for analyzing category clustering data and combine an ideal combination channel of variables cannot be found.

SUMMARY OF THE INVENTION

An exemplary embodiment of the instant disclosure provides a method for generating a category clustering data via a data transmission structure. In detail, the exemplary embodiment of the instant disclosure provides a method for generating a category clustering data via a code division multiple access (CDMA) structure comprising steps of: dividing a dataset to generate dataset categories; and according to the divided dataset categories and, by processing the dataset categories via the CDMA structure, to generate the category clustering data; wherein the dataset includes a plurality of variable sequences; wherein dividing the dataset includes steps of: using a variable slope of each of the variable sequences to perform a segment division on a corresponding variable sequence to generate a plurality of segments which names segment piecewise pairs linear category clustering; and using a distance, an angle and a slope to perform an affinity group on the variable sequences to generate a plurality of groups which names variables category affinity grouping having a logically identity, wherein the variable slope in each segment is performed the affinity group with the segments having the variable sequences which have logically identity or similar similarity in the segments to generate the groups.

The step of using the distance, the angle and the slope to perform the affinity group on the variable sequences to generate the plurality of groups includes steps of: using a fuzzy C-means algorithm to cluster the variable sequences by the distance to generate a first variable category; using a fuzzy spectral angle matching algorithm to cluster the variable sequences by the angle to generate a second variable category; and using a fuzzy slope time series algorithm to cluster the variable sequences by the slope to generate a third variable category; and determining whether the first variable category, the second variable category and the third variable category have the same affinity group; wherein when two or more of the first variable category, the second variable category and the third variable category have the same affinity group, the variable categories having the same affinity group are those having the logical identity.

The step of generating the category clustering data via the CDMA structure processing the dataset categories according to the dataset categories includes steps of: coding the dataset categories to generate a pseudo code and a carrier; outputting a carrier aggregation by an outputting data according to the variable slope, the pseudo code and the carrier; generating a channel module according to the segments and the groups; calculating an error rate of all of the segments in the channel module; receiving the carrier aggregation; and decoding the carrier aggregation to revert to an actual value of this month.

The step of coding the dataset categories to generate the pseudo code and the carrier includes steps of: generating the pseudo code according to a ratio generated from dividing an actual maximum value of each of the variable sequences in each of the segments by a maximum value of twelve month moving average values of the variable sequence in the segment, where the pseudo code is referred to as a weight; and generating a carrier of the twelve month moving average values of each of the variable sequences and a carrier of a sine wave of each of the variable sequences, wherein the variable sequences include a first variable sequence (China's GDP), a second variable sequence (China's export value), a third variable sequence (China's import value), a fourth variable sequence (Exported to China from Taiwan), a fifth variable sequence (Exported to China from Hong Kong), a sixth variable sequence (Exported to China from Korea), a seventh variable sequence (Exported to China from Vietnam), and eighth variable sequence (Shanghai composite index); wherein the carrier of the sine wave is generated by substituting eight sine wave parameter values into a sine wave generation formula, and mapped to the twelve month moving average values, wherein the eight sine wave parameter values includes a maximum amplitude, a minimum amplitude, a skewness, a wave number, left skew and right skew, total points, a starting point and an ending point.

The step of outputting the carrier aggregation by the outputting data according to the variable slope, the pseudo code and the carrier includes steps of: generating a first spread spectrum according to the variable slope of each of the variable sequences divided by the pseudo code in each of the segments; and selecting one of the carrier of the twelve month moving average values of each of the variable sequences and the carrier of the sine wave of each of the variable sequences to integrate with the first spread spectrum to generate the carrier aggregation.

The category clustering data usually has a seasonal error, a fixed month (a periodical) effect (e.g. Lunar effect), a horizontal movement (e.g. Shift level), or a Turmoil interference, etc. Some data need to be executed by a Big Data or a Cloud computing service, so that a terminal host arranges a group number of a compound variable channel combination via a channel module of the CDMA structure.

The step of generating the channel module according to the segments and the groups includes steps of: arranging at least one compound variable channel combination and a group number according to the groups and a dependent variable; arranging a segment number of the segments according to the segments; and combining the group number and the segment number to generate a true code; wherein the true code is a data code of the compound variable channel combination and the segments; wherein the channel module includes the at least one compound variable channel combination.

The step of calculating the error rate of all of the segments in the channel module includes step of: using a fuzzy C-means algorithm to calculate a percentage of non similar attribute subsets of the category clustering in the compound variable channel combination to obtain the error rate, wherein category divides similar objects to a lot of subsets having different group, so that the objects in the same subset have similar attributes. A correct rate is a percentage of the objects of each subset having the similar attributes over all the objects in the subsets.

The step of receiving the carrier aggregation includes steps of: demodulating the carrier aggregation to obtain a second spread spectrum; and obtaining the variable slope by multiply the second spread spectrum by the pseudo code.

The step of decoding the carrier aggregation to revert to the actual value of this month includes steps of: reverting the variable slope to the actual value of this month; and accumulating one by one the actual value of this month and an actual value of last month to obtain a curve of the twelve month moving average values; wherein when obtaining the curve, the curve is stored as an historical data; wherein some special category clustering data (e.g. seasonal data, cycle periodical data, etc.) are transmitted to a backstage host to search analysis rules according to a historical record if necessary.

For further understanding of the instant disclosure, reference is made to the following detailed description illustrating the embodiments of the instant disclosure. The description is only for illustrating the instant disclosure, not for limiting the scope of the claims.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF THE PREFERRED EMBODIMENTS

An embodiment of the present invention provides a data transmission structure based method for generating a category clustering data, in which the category clustering data is divided into a same group according to a similarity of each other. The embodiment of the instant disclosure provides a method for generating a category clustering data via a code division multiple access (CDMA) structure including steps of: normalizing each of a plurality of variable sequences in a dataset, where the dataset includes the plurality of variable sequences, and the variable sequences includes predictor variables and dependent variables, in which the predictor variables and dependent variables are continuous values on timeline; calculating twelve month moving average values of each of the variable sequences, namely the previous six values and the following five values for each value in each variable sequence are captured, and the twelve values are executed a self-convolution to obtain the twelve month moving average values of each of the variable sequences; dividing the dataset to generate dataset categories, where dividing the dataset is that the dataset is divided to obtain the dataset categories; and generating the category clustering data via the CDMA structure processing the dataset categories according to the dataset categories. The step of dividing the dataset includes steps of: using a variable slope of each of the variable sequences to perform a segment division on a corresponding variable sequence to generate a plurality of segments, namely that the variable sequences are divided to obtain a plurality of segments, and the segments are segment piecewise pairs linear category clustering; and using a distance, an angle and a slope to perform an affinity group on the variable sequences to generate a plurality of groups, namely that the variable slope in each segment is performed the affinity group with the segments having the variable sequences which have logical identity or similar similarity in the segments to generate the best groups, such as the variable sequences are clustered in each segment to obtain several groups, and groups are variables category affinity grouping.

The step of generating the category clustering data via the CDMA structure processing the dataset categories according to the dataset categories includes steps of: coding the dataset categories to generate a pseudo code and a carrier; outputting a carrier aggregation by an outputting data according to the variable slope, the pseudo code and the carrier; generating a channel module according to the segments and the groups; calculating an error rate of all of the segments in the channel module; receiving the carrier aggregation; and decoding the carrier aggregation to revert to an actual value of this month, so as to analyze the category clustering data.

The step of coding the dataset categories to generate the pseudo code and the carrier includes steps of: generating the pseudo code according to a ratio generated from dividing an actual maximum value of each of the variable sequences in each of the segments by a maximum value of twelve month moving average values of the variable sequence in the segment, where the pseudo code is referred to as a weight; and generating a carrier of the twelve month moving average values of each of the variable sequences and a carrier of a sine wave of each of the variable sequences, where the variable sequences include a first variable sequence (China's GDP), a second variable sequence (China's export value), a third variable sequence (China's import value), a fourth variable sequence (Exported to China from Taiwan), a fifth variable sequence (Exported to China from Hong Kong), a sixth variable sequence (Exported to China from Korea), a seventh variable sequence (Exported to China from Vietnam), and an eighth variable sequence (Shanghai composite index). The carrier includes the carrier of the twelve month moving average values (MA12) and the carrier of the sine wave. The carrier of the sine wave is mapped to the twelve month moving average values, and is generated by bringing the eight sine wave parameter values including a maximum amplitude, a minimum amplitude, a skewness, a wave number, left skew and right skew, total points, a starting point and an ending point into a sine wave generation formula.

The step of outputting the carrier aggregation by the outputting data according to the variable slope, the pseudo code and the carrier includes steps of: generating a first spread spectrum according to the variable slope of each of the variable sequences divided by the pseudo code in each of the segments; and selecting one of the carrier of the twelve month moving average values of each of the variable sequences and the carrier of the sine wave of each of the variable sequences to integrate with the first spread spectrum to generate the carrier aggregation.

The step of generating the channel module according to the segments and the groups includes steps of: arranging at least one compound variable channel combination and a group number according to the groups and a dependent variable; arranging a segment number of the segments according to the segments; and combining the group number and the segment number to generate a true code, where the true code is a data code of the compound variable channel combination and the segments, so that the data of the compound variable channel combination is transmitted effectively in the same channel. The channel module includes the at least one compound variable channel combination.

The step of calculating the error rate of all of the segments in the channel module includes a step of: using a fuzzy C-means algorithm to calculate a percentage of non similar attribute subsets of the category clustering in the compound variable channel combination to obtain the error rate, where the category is a method to cluster similar objects to a lot of subsets having different combination via a static algorithm, so that the objects in the same subset have similar attributes. A correct rate means a percentage of clustering correctly the objects in the subsets. The error rate equals to one subtracted by the correct rate. The correct rate is a percentage of the objects of each subset having the similar attributes over all the objects in the subsets.

The step of receiving the carrier aggregation includes steps of: demodulating the carrier aggregation to obtain a second spread spectrum; and obtaining the variable slope by multiply the second spread spectrum by the pseudo code.

The step of decoding the carrier aggregation to revert to the actual value of this month includes steps of: reverting the variable slope to the actual value of this month; and accumulating one by one the actual value of this month and an actual value of last month to obtain a curve of the twelve month moving average values.

Figure 1A:
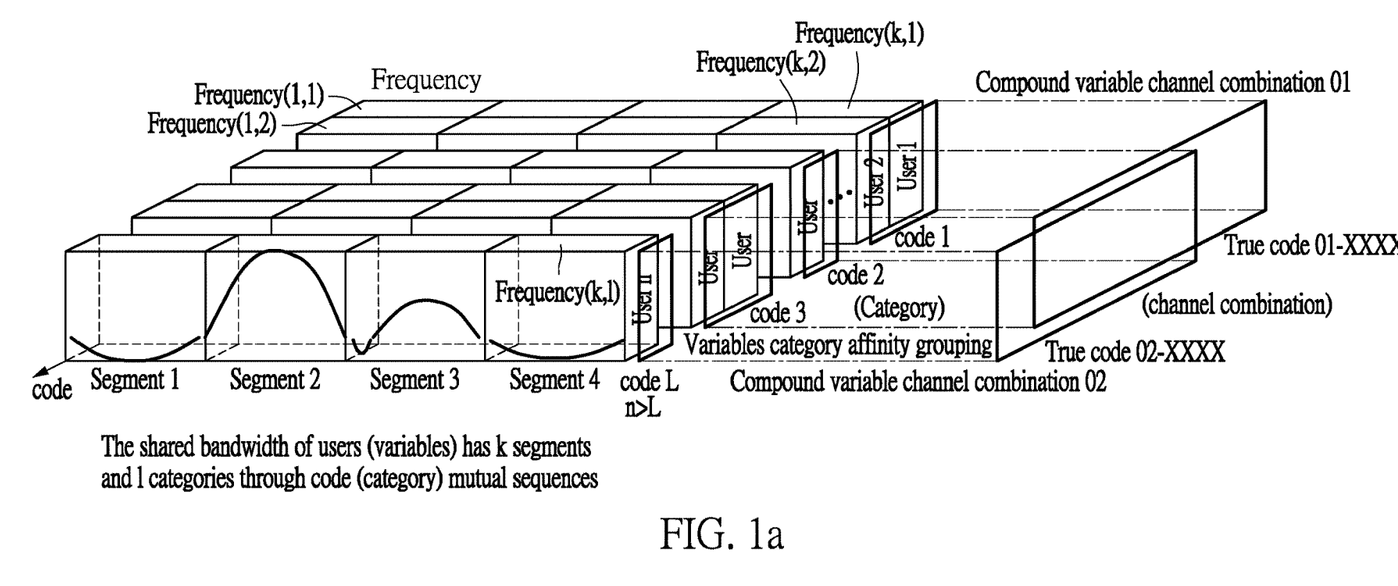
FIG. 1a shows a diagram of generating a channel module in accordance with one embodiment of the present invention.
Figure 1B:
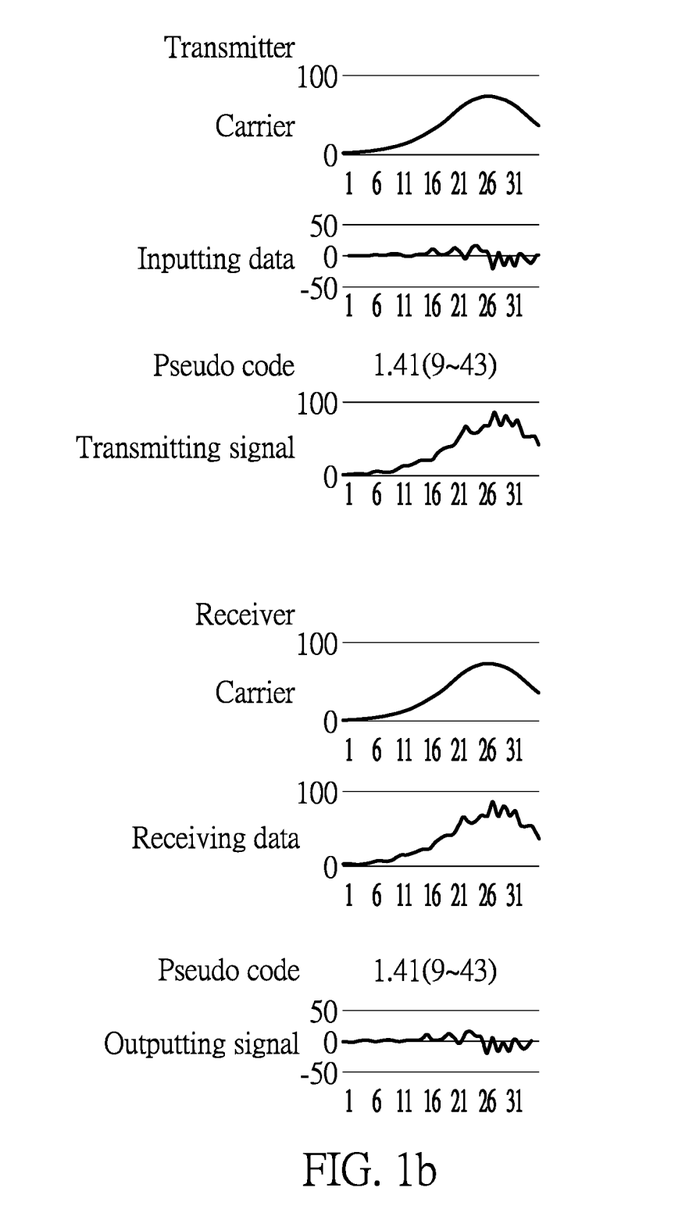
FIG. 1b shows a diagram of a data signal type in an outputting data and a receiving data in accordance with one embodiment of the present invention.
Figure 1C:
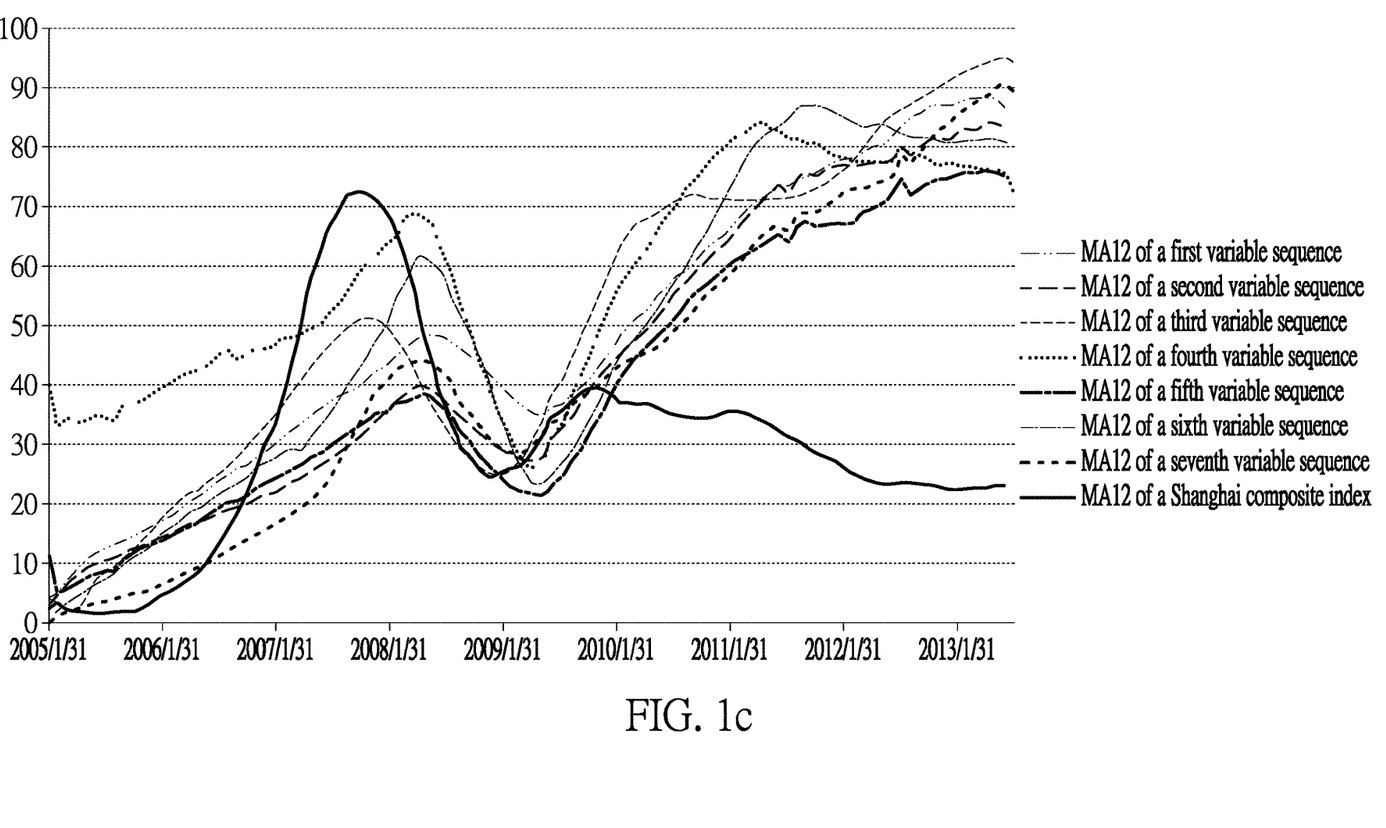
FIG. 1c shows a diagram of a carrier of twelve month moving average values in accordance with one embodiment of the present invention.
Figure 1D:
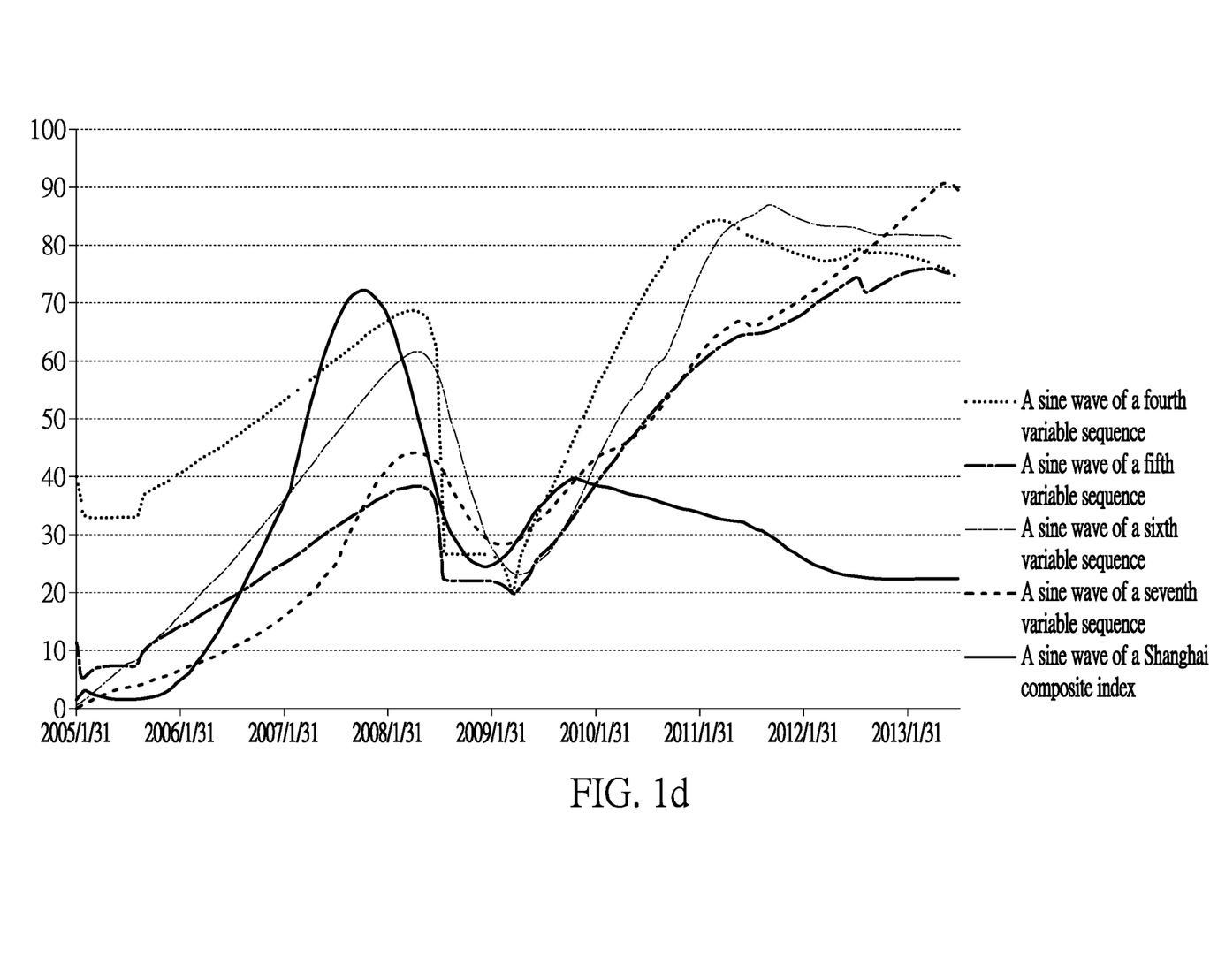
FIG. 1d shows a diagram of a carrier of a sine wave in accordance with one embodiment of the present invention.
Figure 1E:
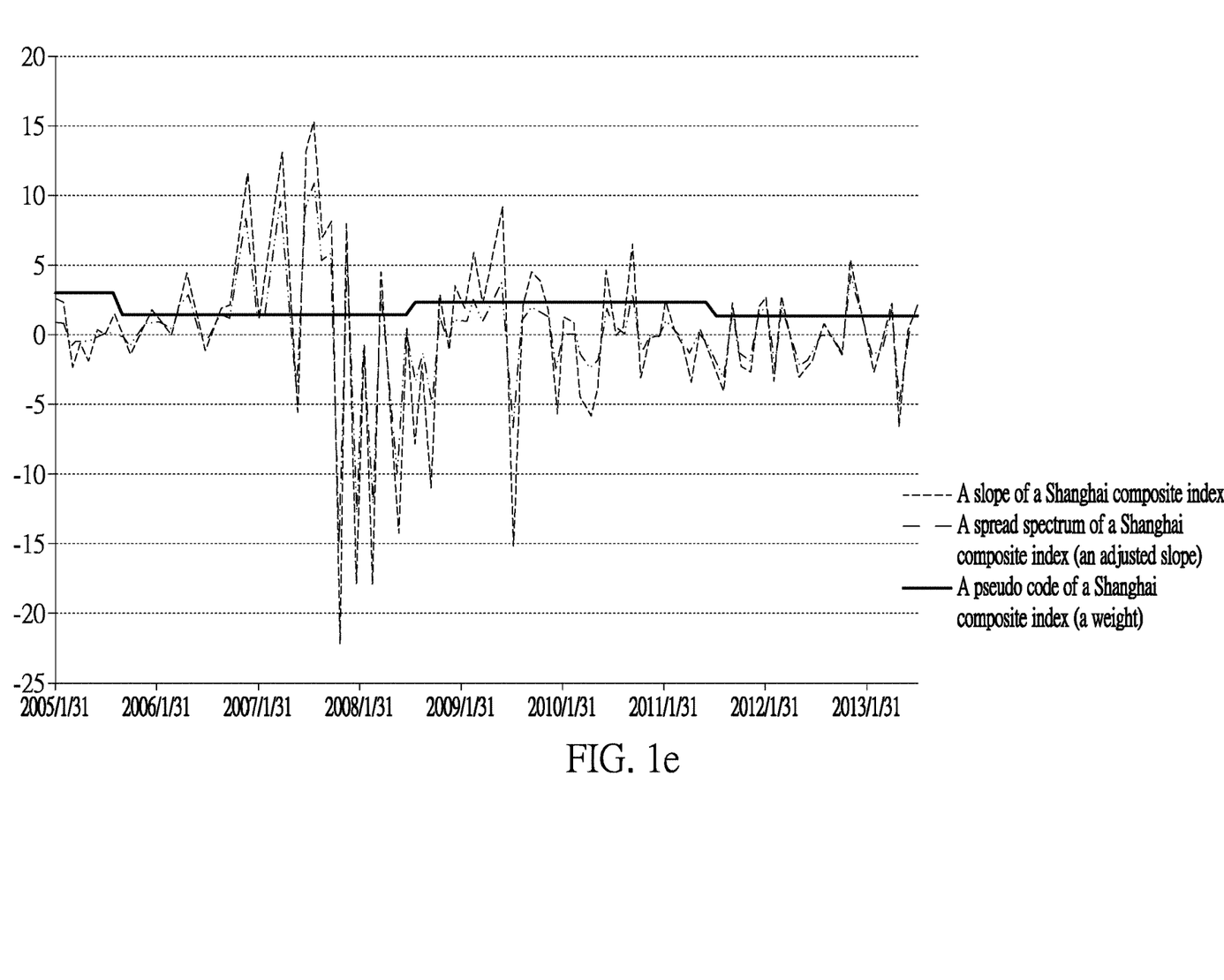
FIG. 1e shows a diagram of a slope of a Shanghai composite index in accordance with one embodiment of the present invention.
Figure 1F:
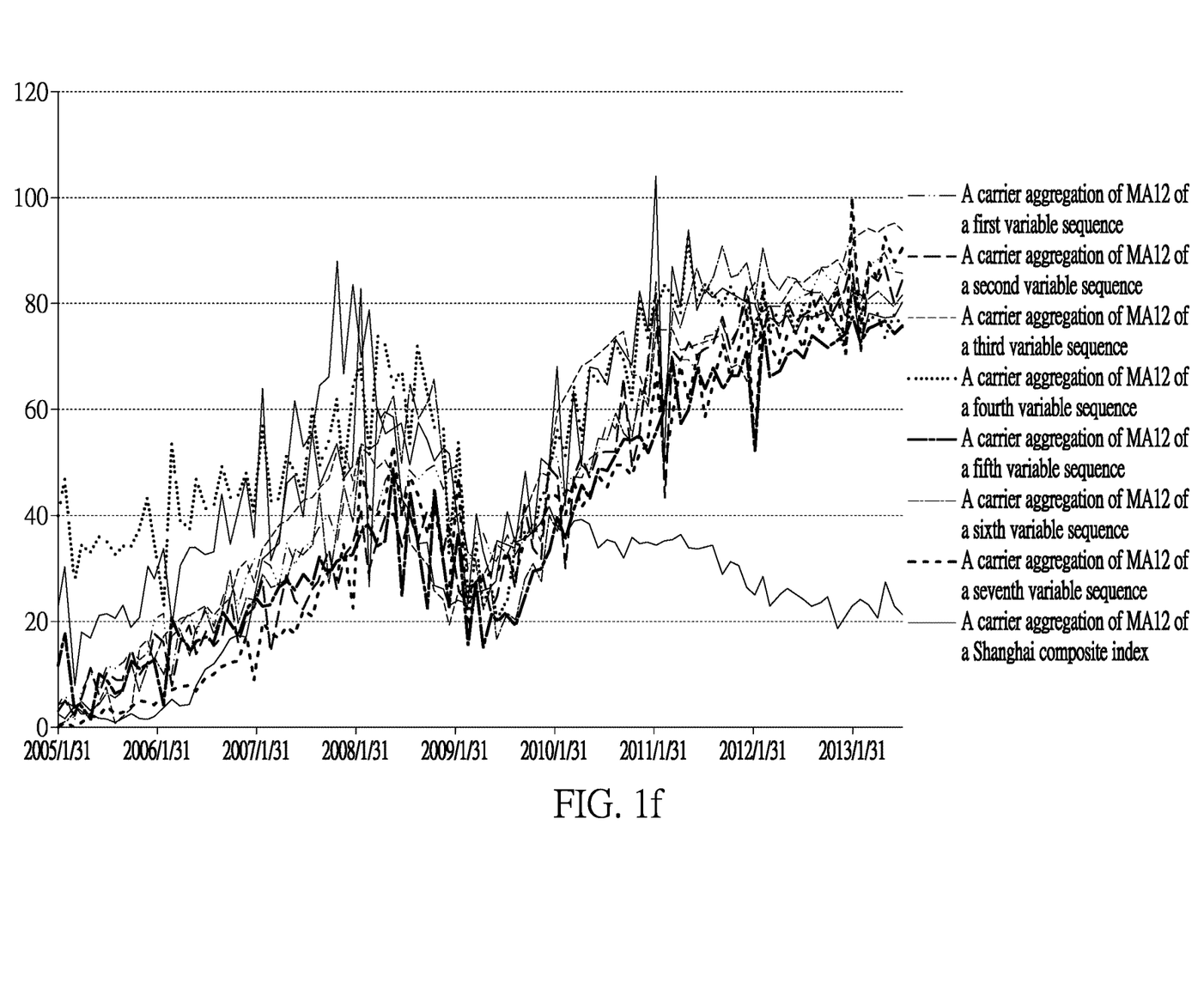
FIG. 1f shows a diagram of a carrier aggregation of twelve month moving average values in accordance with one embodiment of the present invention.
Figure 1G:
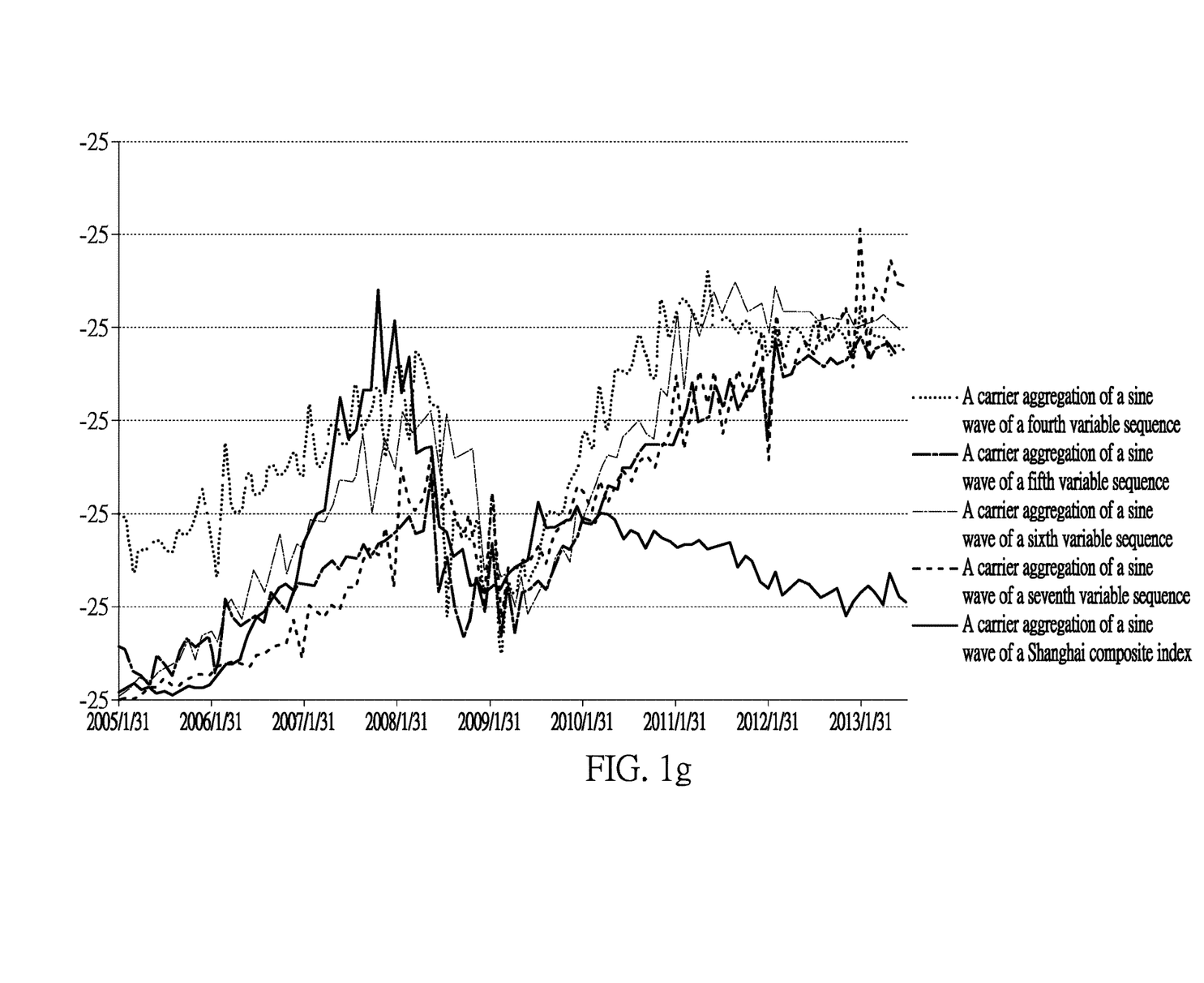
FIG. 1g shows a diagram of a carrier aggregation of a sine wave in accordance with one embodiment of the present invention.
Figure 1H:
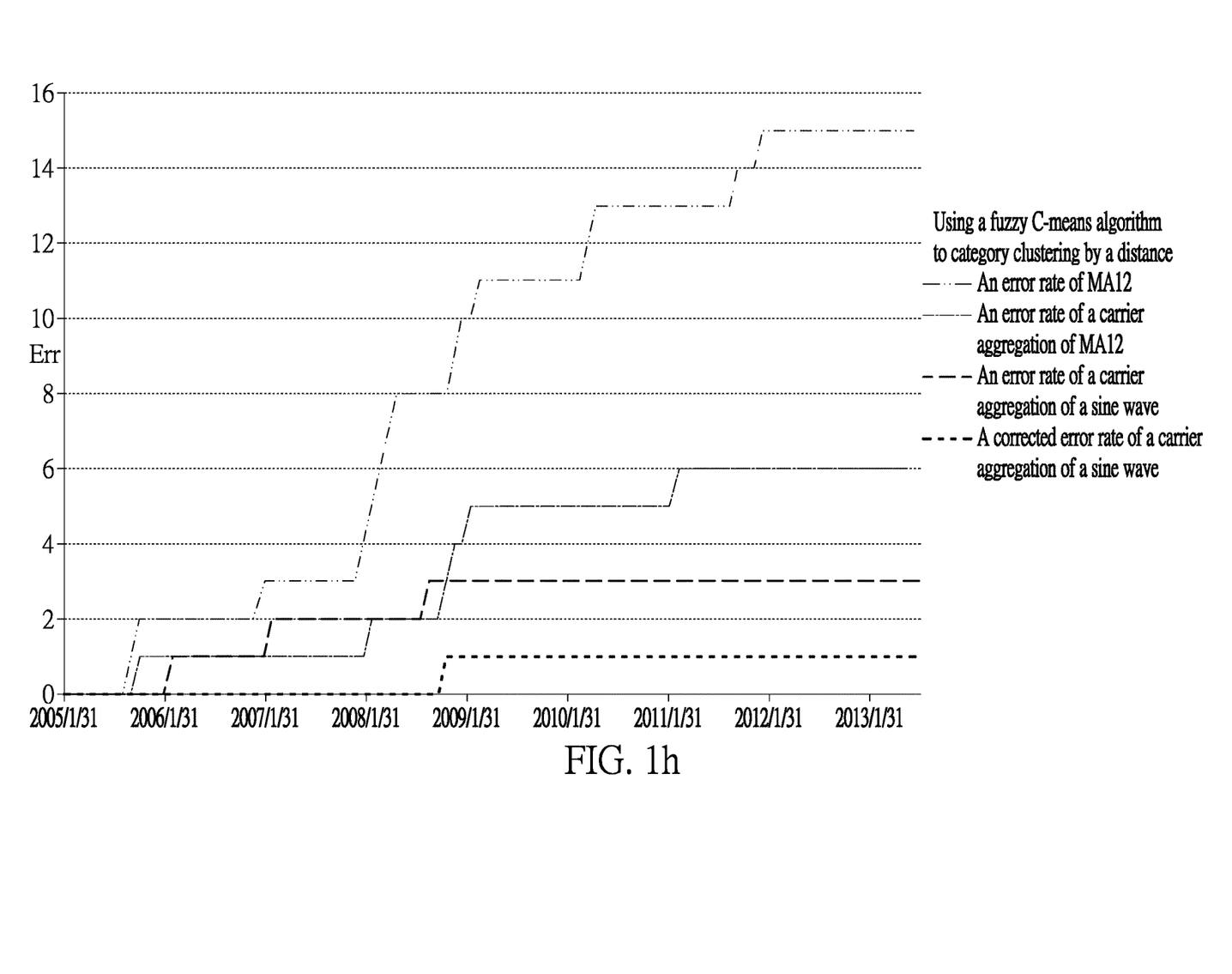
FIG. 1h shows a diagram of an error rate in accordance with one embodiment of the present invention.
Figure 2A:
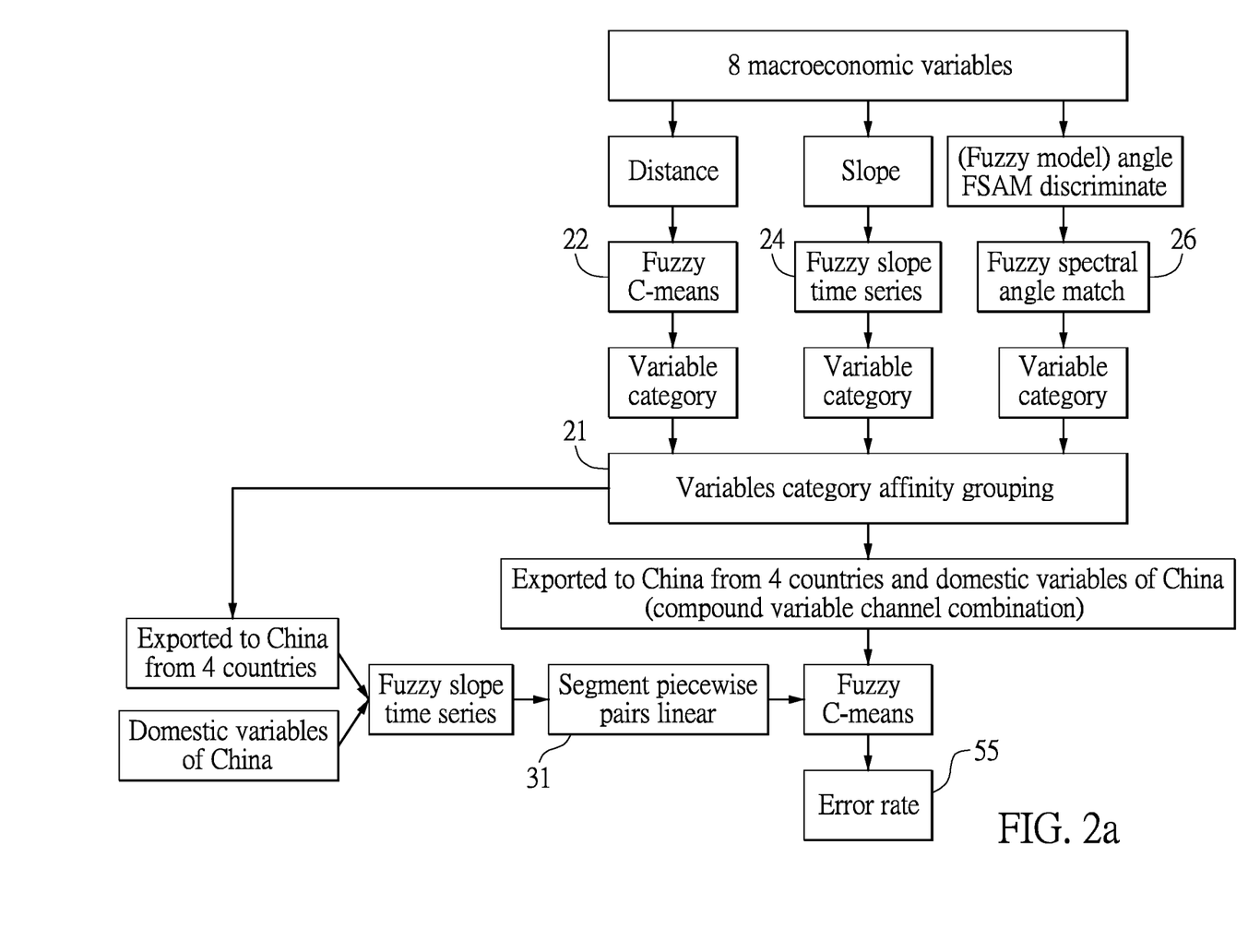
FIG. 2a shows a diagram of dividing data variables in accordance with one embodiment of the present invention.

Referring to FIG. 2a, it is a diagram of dividing data variables in accordance with one embodiment of the present invention. The step of dividing the dataset uses a variable slope of each of the variable sequences to perform a segment division on a corresponding variable sequence to generate a plurality of segments which is referred to as segment piecewise pairs linear category clustering 31, and uses a distance, an angle and a slope to perform an affinity group on the variable sequences to generate a plurality of groups which is referred to as variables category affinity grouping 21 having a logically identity, so as to obtain the best groups number of clustering the dataset. The step of using the distance, the angle and the slope to perform an affinity group on the variable sequences to generate a plurality of groups having the logically identity includes using a fuzzy C-means algorithm 22 to cluster the variable sequences by the distance to generate a first variable category, using a fuzzy spectral angle matching algorithm 26 to cluster the variable sequences by the angle to generate a second variable category, and using a fuzzy slope time series algorithm 24 to cluster the variable sequences by the slope to generate a third variable category, and determining whether the first variable category, the second variable category and the third variable category have the same affinity group. When two or more of the first variable category, the second variable category and the third variable category have the same affinity group, the variable categories having the same affinity group are those having the logically identity, namely the variable slope in each segment is performed the affinity group with the segments having the variable sequences which have logically identity or similar similarity in the segments to generate the best groups.

Figure 2B:
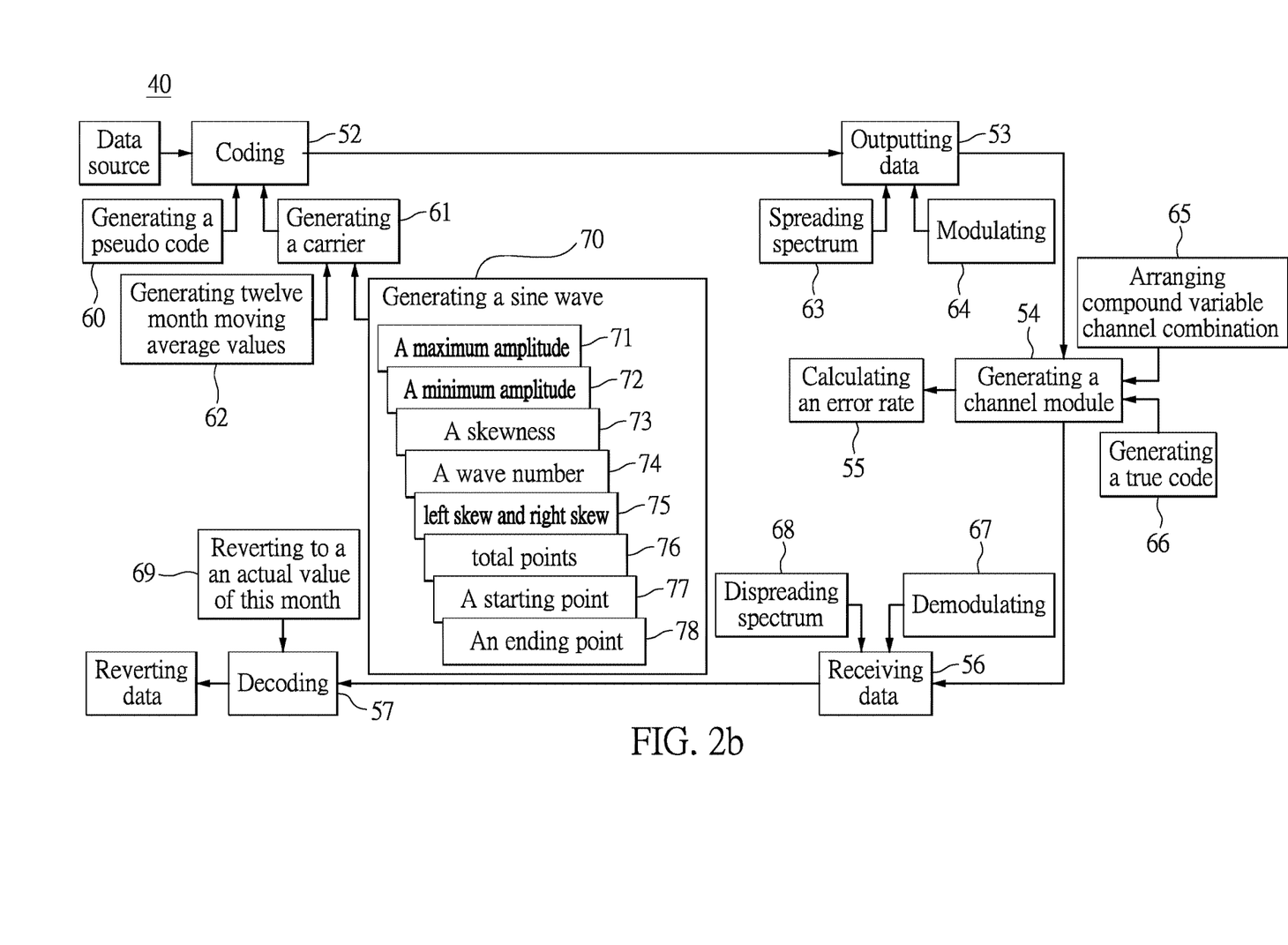
FIG. 2b shows a diagram of a code division multiple access (CDMA) structure in accordance with one embodiment of the present invention.

Referring to FIG. 2b, it is a diagram of a code division multiple access (CDMA) structure in accordance with one embodiment of the present invention. The CDMA structure 40 has one or more hardware to execute the step of generating the category clustering data via the CDMA structure 40 processing the dataset categories according to the dataset categories, which includes: coding 52, outputting data 53, generating a channel module 54, calculating an error rate 55, receiving data 56, and decoding 57, where the coding 52 codes the dataset categories to generate the pseudo code and the carrier, the outputting data 53 outputs the carrier aggregation according to the variable slope, the pseudo code and the carrier, the generating the channel module 54 generates the channel module according to the segments and the groups, the calculating the error rate 55 calculates the error rate of all of the segments in the channel module, the receiving data 56 receives the carrier aggregation, and the decoding 57 decodes the carrier aggregation to revert to the actual value of this month.

The coding 52 includes: generating a pseudo code 60 and generating a carrier 61. The generating the pseudo code 60 generates the pseudo code according to a ratio generated from dividing an actual maximum value of each of the variable sequences in each of the segments by a maximum value of twelve month moving average values of the variable sequence in the segment, where the pseudo code is referred to as a weight, the variable sequences include a first variable sequence (China's GDP), a second variable sequence (China's export value), a third variable sequence (China's import value), a fourth variable sequence (Exported to China from Taiwan), a fifth variable sequence (Exported to China from Hong Kong), a sixth variable sequence (Exported to China from Korea), a seventh variable sequence (Exported to China from Vietnam), and eighth variable sequence (Shanghai composite index). The generating a carrier 61 includes the: generating a carrier of the twelve month moving average values 62 and generating a carrier of a sine wave 70, where the generating a carrier of a sine wave 70 generates the sine wave by substituting eight sine wave parameter values into a sine wave generation formula, in which the eight sine wave parameter values includes a maximum amplitude 71, a minimum amplitude 72, a skewness 73, a wave number 74, left skew and right skew 75, total points 76, a starting point 77 and an ending point 78.

The outputting data 53 outputs the carrier aggregation by the outputting data according to the variable slope, the pseudo code and the carrier. Because after a curve of the twelve month moving average values is flattened, it needs to adjust a slope to apply to the carrier of the sine wave or the carrier of the twelve month moving average values, so as to execute the carrier aggregation. The outputting data 53 includes: spreading spectrum 63 and modulating 64. The spreading spectrum 63 generates a first spread spectrum according to the variable slope of each of the variable sequences divided by the pseudo code in each of the segments. The modulating 64 selects one of the carrier of the twelve month moving average values and the carrier of the sine wave to integrate with the first spread spectrum to generate the carrier aggregation, where the carrier aggregation is referred to as a frequency amplitude modulation.

The generating the channel module 54 includes: arranging at least one compound variable channel combination 65 and generating a true code 66. The arranging the at least one compound variable channel combination 65 arranges the at least one compound variable channel combination and a group number according to the groups and a dependent variable to group the best compound variables having the logically identify by several variable sequences to generate the compound variable channel combination, and arranges a segment number of the segments according to the segments, where the dependent variable is a predicted variable and is the Shanghai composite index herein. The generating the true code 66 combines the group number and the segment number to generate a true code as a data code transmitted by CDMA structure. The first two number of the true code belong to the compound variable channel combination, and the last four number of the true code belong to the segment number. The true code is a data code of the compound variable channel combination and the segments, so that the data of the compound variable channel combination is transmitted effectively on the same channel. The channel module includes the at least one compound variable channel combination.

The calculating the error rate 55 calculates the error rate of all of the segments in the channel module by using a fuzzy C-means algorithm to calculate a percentage of non similar attribute subsets of the category clustering in the compound variable channel combination to obtain the error rate, and evaluating the error rate, where the error is fewer and the correct rate is higher.

The receiving data 56 includes: demodulating 67 and dispreading spectrum 68. The demodulating 67 demodulates the carrier aggregation to obtain a second spread spectrum. The dispreading spectrum 68 obtains the variable slope by multiply the second spread spectrum by the pseudo code.

The decoding 57 includes: reverting to the actual value of this month 69, that the variable slope is reverted to the actual value of this month and accumulated one by one by an actual value of last month to obtain a curve of the twelve month moving average values.

Figure 2C:
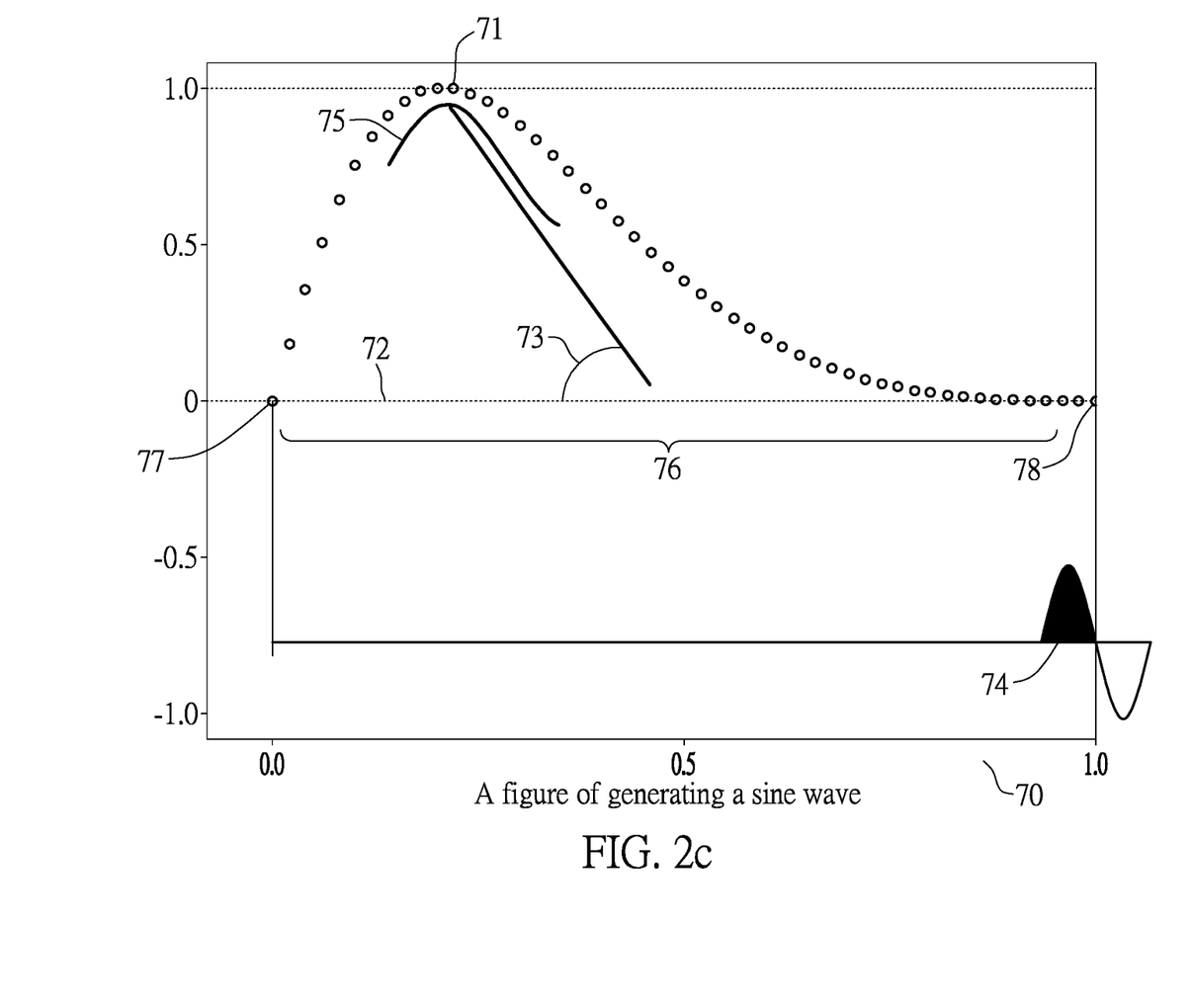
FIG. 2c shows a diagram of eight parameter values for generating a sine wave in a code division multiple access (CDMA) structure in accordance with one embodiment of the present invention.

Referring to FIG. 2c, it is a diagram of eight parameter values for generating a sine wave in a CDMA structure in accordance with one embodiment of the present invention. The generating the carrier of the sine wave 70 in the generating the carrier 61 substitutes eight sine wave parameter values into a sine wave generation formula, and mapped to the twelve month moving average values, wherein the eight sine wave parameter values includes a maximum amplitude 71, a minimum amplitude 72, a skewness 73, a wave number 74, left skew and right skew 75, total points 76, a starting point 77 and an ending point 78. For example, the maximum amplitude 71 equals to 1, the minimum amplitude 72 equals to 0, a skewness 73 equals to 2, a wave number 74 equals to ½, left skew and right skew 75 are that an upper part of the sine wave is toward left deviation and a lower part of the sine wave is toward right deviation, total points 76 equals to 24, a starting point 77 equals to 1 and an ending point 78 equals to 24.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A method for generating a category clustering data via a code division multiple access (CDMA) structure, comprising:

dividing a dataset to generate dataset categories, wherein the dataset includes a plurality of variable sequences; and according to the divided dataset categories and, by processing the dataset categories via the CDMA structure, to generate the category clustering data;

wherein dividing the dataset includes:

using a variable slope of each of the variable sequences to perform a segment division on a corresponding variable sequence to generate a plurality of segments which names segment piecewise pairs linear category clustering; and using a distance, an angle and a slope to perform an affinity group on the variable sequences to generate a plurality of groups which names variables category affinity grouping having a logically identity, wherein the variable slope in each segment is performed the affinity group with the segments having the variable sequences which have logically identity or similar similarity in the segments to generate the groups;

wherein using the distance, the angle and the slope to perform the affinity group on the variable sequences to generate the plurality of groups includes:

using a fuzzy C-means algorithm to cluster the variable sequences by the distance to generate a first variable category;
using a fuzzy spectral angle matching algorithm to cluster the variable sequences by the angle to generate a second variable category;
using a fuzzy slope time series algorithm to cluster the variable sequences by the slope to generate a third variable category; and
determining whether the first variable category, the second variable category and the third variable category have the same affinity group;
wherein when two or more of the first variable category, the second variable category and the third variable category have the same affinity group, the variable categories having the same affinity group are those having the logical identity;
wherein generating the category clustering data via the CDMA structure processing the dataset categories according to the dataset categories includes:
coding the dataset categories to generate a pseudo code and a carrier;
outputting a carrier aggregation by an outputting data according to the variable slope, the pseudo code and the carrier;
generating a channel module according to the segments and the groups; and
calculating an error rate of all of the segments in the channel module.

2. The method according to claim 1, wherein coding the dataset categories to generate the pseudo code and the carrier includes:
generating the pseudo code according to a ratio generated from dividing an actual maximum value of each of the variable sequences in each of the segments by a maximum value of twelve month moving average values of the variable sequence in the segment; and
generating the carrier of the twelve month moving average values of each of the variable sequences and the carrier of a sine wave of each of the variable sequences.

3. The method according to claim 2, wherein the carrier of the sine wave is generated by bringing eight sine wave parameter values into a sine wave generation formula, wherein the eight sine wave parameter values includes a maximum amplitude, a minimum amplitude, a skewness, a wave number, left skew and right skew, total points, a starting point and an ending point.

4. The method according to claim 2, wherein outputting the carrier aggregation by the outputting data according to the variable slope, the pseudo code and the carrier includes:
generating a first spread spectrum according to the variable slope of each of the variable sequences divided by the pseudo code in each of the segments; and
selecting one of the carrier of the twelve month moving average values of each of the variable sequences and the carrier of the sine wave of each of the variable sequences to integrate with the first spread spectrum to generate the carrier aggregation.

5. The method according to claim 4, wherein generating the channel module according to the segments and the groups includes:
arranging at least one compound variable channel combination and a group number according to the groups and a dependent variable;
arranging a segment number of the segments according to the segments; and
combining the group number and the segment number to generate a true code;
wherein the true code is a data code of the compound variable channel combination and the segments;
wherein the channel module includes the at least one compound variable channel combination.

6. The method according to claim 5, wherein calculating the error rate of all of the segments in the channel module includes:
using the fuzzy C-means algorithm to calculate a percentage of non similar attribute subsets of the category clustering in the compound variable channel combination to obtain the error rate.

7. The method according to claim 6, wherein generating the category clustering data via the CDMA structure processing the dataset categories according to the dataset categories further includes:
receiving the carrier aggregation; and
decoding the carrier aggregation to revert to an actual value of this month.

8. The method according to claim 7, wherein receiving the carrier aggregation includes:
demodulating the carrier aggregation to obtain a second spread spectrum; and
obtaining the variable slope by multiply the second spread spectrum by the pseudo code.

9. The method according to claim 8, wherein decoding the carrier aggregation to revert to the actual value of this month includes:
reverting the variable slope to the actual value of this month; and
accumulating one by one the actual value of this month and an actual value of last month to obtain a curve of the twelve month moving average values.

* * * * *